US005759964A

United States Patent [19]

Shuchart et al.

[11] Patent Number: 5,759,964
[45] Date of Patent: Jun. 2, 1998

[54] HIGH VISCOSITY WELL TREATING FLUIDS, ADDITIVES AND METHODS

[75] Inventors: Chris Shuchart; Michael L. Walker, both of Duncan, Okla.

[73] Assignee: Halliburton Energy Services, Inc., Duncan, Okla.

[21] Appl. No.: 314,104

[22] Filed: Sep. 28, 1994

[51] Int. Cl.[6] .............................. E21B 43/27; C09K 7/02
[52] U.S. Cl. ..................... 507/209; 507/211; 507/212; 507/213; 507/214; 507/215; 507/216; 507/217
[58] Field of Search .............................. 507/209, 211, 507/212, 213, 214, 215, 216, 217, 110, 112, 113, 114, 115

[56] References Cited

U.S. PATENT DOCUMENTS

| | | | |
|---|---|---|---|
| 4,552,675 | 11/1985 | Brown et al. | 252/8.55 R |
| 4,704,214 | 11/1987 | Russell et al. | 252/8.514 |
| 4,750,562 | 6/1988 | Jennings, Jr. | 166/281 |

*Primary Examiner*—S. Mark Clardy
*Attorney, Agent, or Firm*—Robert A. Kent; Clark Dougherty, Jr.

[57] ABSTRACT

Improved high viscosity well treating fluids for use at temperatures above about 200° F., gel breaking additives for the treating fluids and methods of using the treating fluids are provided by the present invention. The high viscosity well treating fluids are basically comprised of an aqueous liquid, a polysaccharide gelling agent to increase the viscosity of the aqueous liquid and a gel breaker comprised of a bromate ion releasing compound to reduce the viscosity of the aqueous liquid after a desired period of time.

31 Claims, No Drawings

5,759,964

HIGH VISCOSITY WELL TREATING FLUIDS, ADDITIVES AND METHODS

BACKGROUND OF THE INVENTION

1. Field of the Invention

The present invention relates to improved high viscosity gelled well treating fluids, gel breaking additives therefor and methods of using the well treating fluids, and more particularly, to such treating fluids, additives and methods which can be utilized at temperatures above about 200° F.

2. Description of the Prior Art

High viscosity well treating fluids, and particularly high viscosity gelled aqueous treating fluids, are commonly utilized in the construction and stimulation of oil and gas wells. For example, such treating fluids are utilized in completion techniques such as forming gravel packs and the like. A common stimulation procedure which is performed using a high viscosity treating fluid is hydraulic fracturing. Hydraulic fracturing is accomplished by injecting a high viscosity fluid through the well bore into a subterranean formation to be fractured and applying sufficient fluid pressure on the formation to cause its breakdown and the production of one or more fractures therein. A fracture proppant such as sand or other particulate material is usually suspended in the high viscosity fracturing fluid whereby the proppant is carried into the fractures and deposited therein. When pressure on the fractured formation is released, the fractures are propped open by the proppant material therein.

The most common type of high viscosity well treating fluid utilized for the above described purposes is a gelled aqueous liquid. Such gelled aqueous liquids include a gelling agent which increases the viscosity of the liquid to a sufficiently high level whereby particulate solids suspended in the liquid are retained therein while the liquid flows through the well bore and into the subterranean zone to be treated therewith.

When a gelled aqueous treating fluid is utilized in a formation having a temperature above about 200° F., a gel stabilizer, e.g., sodium thiosulfate, is generally added to the fluid. The gel stabilizer functions to prevent premature gel degradation by scavaging oxygen from the fluid. The use of alkali metal thiosulfates as gel stabilizers is well known in the art.

After a high viscosity gelled aqueous treating fluid has been pumped into a subterranean zone or formation and used to perform completion or stimulation procedures therein, it is caused to revert to a relatively low viscosity liquid whereby it can be recovered. Generally, the highly viscous treating fluid is converted into a low viscosity liquid after a desired period of time by including a gel breaker in the fluid prior to pumping it into the subterranean formation or zone.

Heretofore utilized gel breakers such as oxidizing sodium or ammonium persulfates have been used successfully to break gelled aqueous treating fluids after a desired period of time at temperatures up to about 200° F. However, at temperatures above about 200° F., such gel breakers cause the treating fluids to break too rapidly resulting in premature loss of viscosity. Such premature loss of viscosity can cause serious problems and/or bring about less than desirable completion and/or stimulation results.

The inclusion of a gel stabilizer of the type described above in a high viscosity treating fluid to prevent high temperature gel degradation for a desired period of time often interferes with the ability of prior art gel breakers to function properly. That is, the prior art gel breakers often react with the gel stabilizer which brings about undesirable results such as premature or insufficient breaking of the treating fluid.

While most high viscosity treating fluids will break if given enough time at high temperatures even in the presence of gel stabilizers, it is most desirable to return the well to production as quickly as possible after a completion or stimulation treatment has been performed. That is, it is desirable to break a high viscosity treating fluid within 6 to 24 hours after its introduction into a subterranean formation or zone.

Thus, there is a need for improved high viscosity well treating fluids, gel breaking additives for such fluids and methods of utilizing such fluids at temperatures over about 200° F. whereby the treating fluids reliably break within a desired relatively short period of time.

SUMMARY OF THE INVENTION

The present invention provides improved high viscosity well treating fluids, gel breaking additives therefor and methods of using such fluids which meet the need described above and overcome the shortcomings of the prior art.

The improved high viscosity well treating fluids of the present invention are basically comprised of an aqueous liquid, a polysaccharide gelling agent present in an amount sufficient to increase the viscosity of the aqueous liquid and a gel breaker to reduce the viscosity of the aqueous liquid after a desired period of time comprising an effective amount of a compound which releases bromate ion in the aqueous liquid. The treating fluids can also include an effective amount of a catalyst for the gel breaker comprised of a compound which releases a transition metal ion in the aqueous liquid. Further, the treating fluids can optionally include a thiosulfate gel stabilizer which both stabilizes the treating fluid against high temperature degradation and enhances the operation of the gel breaker after a desired period of time.

Additives for breaking high viscosity gelled aqueous well treating fluids in desired periods of time at temperatures above about 200° F. are also provided. The additives are basically comprised of a gel breaker comprised of a compound which releases bromate ion in an aqueous liquid. Optionally, the additives can include an effective amount of a catalyst for the gel breaker comprised of a compound which releases a transition metal ion in an aqueous liquid. The additives can also optionally include a thiosulfate gel stabilizer.

Methods of utilizing the improved high viscosity well treating fluids of this invention are also provided.

It is, therefore, a general object of the present invention to provide improved high viscosity well treating fluids, additives and methods.

Other and further objects, features and advantages of the present invention will be readily apparent to those skilled in the art upon a reading of the description of preferred embodiments which follows.

DESCRIPTION OF PREFERRED EMBODIMENTS

The present invention provides additives for breaking high viscosity gelled aqueous well treating fluids, either linear or crosslinked, in desired periods of time at temperatures above about 200° F. The additives are effective and enhanced in the presence of alkali metal thiosulfates, and the additives bring about relatively rapid breaks over a broad pH range. Also provided are improved high viscosity well treating fluids for use in performing completion, stimulation and other similar well treatments and methods of using the improved treating fluids.

The additives of this invention for breaking high viscosity gelled aqueous treating fluids at high temperatures are basically comprised of a gel breaker to reduce the viscosity of the aqueous gelled treating fluid after a desired period of time comprising an effective amount of a compound which releases bromate ion in the aqueous liquid. For example, the gel breaker can be any alkali metal bromate, alkaline earth metal bromate or other compound or material containing bromate ion which is capable of releasing the bromate ion in an aqueous liquid and does not adversely react or interfere with the components or function of the gelled treating fluid. The gel breaker is preferably selected from the group consisting of sodium bromate and potassium bromate due to their availability, and most preferably the gel breaker is sodium bromate.

Bromate ion by itself is effective in achieving the delayed breaking of an aqueous gelled treating fluid having a pH in the range of from about 6 to about 7 at temperatures above about 200° F. and at concentrations of about 15 pounds of the gel breaker per 1000 gallons of treating fluid. However, bromate ion does not function well as a breaker in a gelled aqueous treating fluid having a pH in the range of from about 8 to about 11 at temperatures above about 200° F.

In order to reduce the quantity of the bromate ion releasing compound required and broaden the pH range in which bromate ion functions as a breaker at the above mentioned high temperatures, a catalyst for the gel breaker can be included in the additive of this invention. Generally, the catalyst is selected from the group consisting of water soluble compounds containing transition metal ions which function to catalyze the gel breaker. Particularly suitable transition metal ions are manganese ions and copper ions. Examples of suitable water soluble compounds which release the above transition metal ions are manganese sulfate and copper chloride.

When the water soluble transition metal ion releasing catalyst compound is utilized, it is included in the additive in an amount in the range of from about 0.05 pounds to about 2 pounds per pound of bromate gel breaker in the additive. Most preferably the additive is comprised of a sodium bromate gel breaker and copper chloride catalyst for releasing copper II (2+) ion present in the additive in an amount of about 0.5 pounds per pound of sodium bromate therein.

Another component which can optionally be included in the additive is a thiosulfate gel stabilizer which functions to stabilize a gelled treating fluid whereby it does not lose its viscosity prematurely due to being exposed to high temperatures. Such gel stabilizers, e.g., alkali metal thiosulfates, have been found to improve the effectives of the bromate gel breakers of this invention as well as to prevent premature high temperature induced gelled treating fluid viscosity loss.

The bromate gel breaker is combined with the treating fluid in an amount in the range of from about 1 to about 30 pounds per 1000 gallons of water in the treating fluid. When used, the transition metal ion releasing catalyst compound is added to the treating fluid in an amount in the range of from about 0.05 pound to about 2 pounds per pound of bromate gel breaker used. If a thiosulfate gel stabilizer is also used, it is added to the treating fluid in an amount in the range of from about 1 pound to about 30 pounds per 1000 gallons of water in the treating fluid.

The improved high viscosity well treating fluids of this invention which can be utilized at temperatures above 200° F., and which are particularly useful in the temperature range of from about 200° F. to about 300° F., are comprised of an aqueous liquid, a polysaccharide gelling agent, and a gel breaker comprised of a compound which releases bromate ion in the aqueous liquid. A catalyst for the gel breaker, i.e., a transition metal ion releasing compound can optionally also be included as can a thiosulfate gel stabilizer.

The aqueous liquid utilized can be substantially any aqueous liquid including fresh water, salt water, brines, seawater and the like so long as the aqueous liquid used does not adversely react with other components making up the high viscosity well treating fluid. Preferably, the aqueous liquid employed is fresh water containing a low concentration of a clay stabilizing salt such as potassium chloride in an amount of about 0.5% to about 3.0% by weight.

The polysaccharide gelling agent which is added to the aqueous liquid to increase the viscosity thereof is generally selected from the group consisting of galactomannan gums, modified or derivative galactomannan gums and cellulose derivatives. Examples of galactomannan gums which can be utilized include gum arabic, gum ghatti, gum karaya, tamarind gum, tragacanth gum, guar gum, locust bean gum and the like. Such gums can be modified such as by forming carboxyalkyl and hydroxyalkyl derivatives thereof. Examples of such derivatives which are particularly suitable for use in accordance with this invention are carboxymethyl guar and hydroxypropyl guar. Double derivatives can also be utilized, e.g., carboxymethylhydroxypropyl guar.

Modified celluloses and derivatives thereof can also be utilized as gelling agents in accordance with this invention. In generally, any of the water-soluble cellulose ethers can be used such as the various carboxyalkyl cellulose ethers, e.g., carboxyethyl cellulose and carboxymethyl cellulose. Mixed ethers such as carboxymethylhydroxyethyl cellulose and hydroxyalkyl celluloses such as hydroxyethyl cellulose and hydroxypropyl cellulose can also be utilized. Further, alkyl celluloses such as methyl cellulose, ethyl cellulose and propyl cellulose, alkylhydroxyalkyl celluloses such as methylhydroxypropyl cellulose, alkylcarboxyalkyl celluloses such as ethylcarboxymethyl cellulose, alkylalkyl celluloses such as methylethyl cellulose, and hydroxyalkylalkyl celluloses such as hydroxypropylmethyl cellulose can all be utilized.

A preferred derivatized cellulose is a hydroxyethyl cellulose grafted with vinyl phosphonic acids such as is disclosed in U.S. Pat. No. 5,067,565 issued Nov. 26, 1991 to Holtmeyer et al. and assigned to the assignee of this present invention. The disclosure of U.S. Pat. No. 5,067,565 is incorporated herein by reference. Other polysaccharide gelling agents or their equivalents which are known in the art, but which are not specifically mentioned herein can also be utilized.

The preparation of high viscosity gelled aqueous fluids for use in carrying out treatments in subterranean formations or zones is well understood by those skilled in the art. The amount of gelling agent employed in the base aqueous liquid depends upon the desired final viscosity of the resulting solution. Generally, the gelling agent is combined with the aqueous liquid in an amount in the range of from about 10 pounds to about 200 pounds per 1000 gallons of the aqueous liquid. A more preferred concentration within the above general range is from about 30 pounds to about 60 pounds of gelling agent per 1000 gallons of the aqueous liquid. A polysaccharide gelled aqueous liquid which is not crosslinked (known in the art as a linear gel) can develop relatively high viscosity, e.g., as high as from about 10 to about 300 centipoises measured on a Fann Model 35 viscometer at 70° F. and at an rpm of 300.

When a higher viscosity is required, such as when the gelled aqueous treating fluid is utilized as a fracturing fluid and must carry proppant material suspended therein, the gelled aqueous liquid can be crosslinked to further increase its viscosity. While a variety of crosslinking agents can be utilized for crosslinking a polysaccharide gelled aqueous liquid, particularly suitable such crosslinking agents are transition metal containing compounds which release transition metal ions when dissolved in an aqueous liquid. Examples of particularly suitable transition metal ions for crosslinking the polysaccharide gelled aqueous liquids described above are titanium IV (4+), zirconium IV (4+), antimony III (3+), chromium III (3+) and aluminum III (3+). Examples of compounds which are water soluble and which supply zirconium IV ions are zirconium lactate, zirconium carbonate, zirconium acetylacetonate and zirconium diisopropylamine lactate. Compounds capable of supplying titanium IV, antimony III, chromium III and aluminum III are well known to those skilled in the art and comprise similarly conventional compounds such as potassium pyroantimonate, titanium acetylacetonate, titanium triethanolamine, chromium III citrate, aluminum acetate and the like. A borate releasing compound can also be utilized as a crosslinking agent. The particular borate compound used may be any compound which supplies borate ions in a hydrated polysaccharide gelled aqueous liquid. For example, the borate source may be a rapidly soluble borate containing compound such as boric acid, borax or "POLY-BOR" manufactured by the U.S. Borax Company. The borate source may also be a slowly soluble borate such as alkaline earth metal borates, alkali metal borates and the like. The use of slowly soluble borate releasing compounds in a gelled aqueous treating fluid delays a significant viscosity increase due to crosslinking until after the treating fluid is pumped into the well bore.

The particular crosslinking agent utilized, i.e., the transition metal or borate ion releasing compound, is generally combined with the gelled aqueous treating fluid in the form of an aqueous concentrate in an amount in the range of from about 0.1 gallon to about 5 gallons per 1000 gallons of water in the treating fluid, more preferably in an amount of from about 0.1 gallon to about 2 gallons per 1000 gallons of water.

As mentioned, the improved high viscosity well treating fluids of this invention include a gel breaking bromate ion releasing compound, and optionally, a catalyst for the gel breaker selected from the group consisting of water soluble compounds containing transition metal ions which function to catalyze the gel breaker. Examples of suitable transition metal ions for use as gel breaker catalysts in accordance with this invention are manganese ions and copper ions. Of these, copper ion is preferred with copper II (2+) ion being the most preferred. Compounds containing such transition metal ions which are soluble in hydrated aqueous gels and which can be utilized for supplying the ions therein are copper sulfate and copper chloride.

The bromate gel breaker, preferably potassium or sodium bromate, is added to the gelled or gelled and crosslinked aqueous liquid in an amount in the range of from about 1 pound to about 30 pounds per 1000 gallons of water in the treating fluid. When included, the water soluble ion releasing catalyst compound, preferably copper chloride, is added to the treating fluid in an amount in the range of from about 0.05 pound to about 2 pounds per pound of the gel breaker used. The particular amounts of gel breaker and catalyst employed within the ranges mentioned above are those amounts required to reduce the viscosity of the treating fluid at a temperature above about 200° F. to a preselected lower viscosity or to a complete break within a desired period of time. The optimum amount of gel breaker and catalyst employed depends on the particular treatment being performed and the characteristics and conditions of the formation or zone in which the treatment is carried out.

As mentioned previously, the high viscosity well treating fluids of this invention can also advantageously include a thiosulfate gel stabilizer to stabilize the fluids whereby they do not suffer premature viscosity loss when introduced into a formation at an elevated temperature, i.e., a temperature above about 200° F., and to increase the effectiveness of the gel breaker. The gel stabilizer commonly utilized is an alkali metal thiosulfate which scavenges oxygen in the treatment fluid and thereby prevents its premature degradation. When utilized, an alkali metal thiosulfate, e.g., sodium thiosulfate, is included in the high viscosity treating fluid in an amount in the range of from about 1 pound to about 30 pounds per 1000 gallons of water in the treating fluid.

The treating fluid may also include a variety of conventional additives such as proppant materials, pH control agents, bactericides, clay stabilizers, surfactants and the like which do not adversely affect other components in the treating fluid or inhibit the performance of a desired subterranean formation or zone treatment using the treating fluid.

In accordance with the methods of the present invention a subterranean formation or zone penetrated by a well bore and having a temperature above about 200° F. is treated to produce a desired result such as forming a gravel pack adjacent to the formation to prevent the migration of fines with produced fluids or to stimulate the formation or zone to increase the production of hydrocarbons therefrom. The methods basically comprise the steps of injecting a high viscosity gelled aqueous treating fluid of this invention which subsequently breaks into a low viscosity fluid into the formation or zone by way of the well bore, and then recovering the low viscosity treating fluid from the formation or zone after the treatment has been performed and the high viscosity treating fluid has broken. In a stimulation treatment, a subterranean formation or zone having a temperature above about 200° F. is fractured by pumping a high viscosity well treating fluid of the present invention by way of the well bore into the formation or zone at a rate and pressure sufficient to fracture the formation. Proppant material is suspended in the treating fluid which is deposited in the fracture or fractures created in the formation or zone upon the breaking of the treating fluid into a low viscosity fluid. The low viscosity fluid is recovered by lowering the pressure on the formation and producing the treating fluid along with formation fluids through the propped fractures and well bore to the surface.

In order to further illustrate the treating fluids, additives and methods of the present invention, the following examples are provided.

EXAMPLE 1

Static break tests were performed to evaluate the breaker additive of the present invention in gelled aqueous treating fluids containing sodium thiosulfate gel stabilizer at elevated temperatures. A gelled aqueous fluid was prepared by adding to fresh water a clay stabilizer comprised of an aqueous quaternary ammonium chloride concentrate in an amount of 2 gallons per 1000 gallons of water and carboxymethylhydroxy- propyl guar gelling agent in an amount of 40 pounds per 1000 gallons of water. After initial mixing, an acetic acid/acetate buffer in an amount of 0.25 gallons per 1000 gallons of water was added to lower the pH to approximately 6–7. The resulting mixture was stirred for about 30 minutes to permit the gelling agent to hydrate, and an aqueous zirconium crosslinker concentrate was added to the resulting gelled aqueous liquid in an amount of 0.8 gallons per 1000 gallons of water. Samples of the gelled aqueous liquid containing crosslinker were placed in glass jars, and various quantities of sodium thiosulfate gel stabilizer and/or potassium bromate gel breaker were added to the samples. The jars were placed in bombs which were pressurized to 100 psig with nitrogen, and the pressurized bombs were placed in oil baths whereby they were heated to the test temperatures given in Table I below. After two hours, the samples were cooled to room temperature. The cooled samples were then tested for crosslinking character utilizing a Fann Model 35A viscometer. If the fluid was crosslinked, a visual evaluation was utilized to determine the extent of the crosslinking. After the initial test, the samples were returned to the test equipment and retested at 24 hours. Independent samples were removed and inspected after 6 hours. The results of these tests are given in Table I below.

TABLE I

Break Tests At Various Temperatures

| Temperature, °F. | Gel Stabilizer Concentration, Pounds Per 1000 Gallons Of Water | Gel Breaker Concentration, Pounds Per 1000 Gallons Of Water | Fann Viscometer Readings Or Extent Of Crosslinking | | |
|---|---|---|---|---|---|
| | | | 2 Hrs. | 6 Hrs. | 24 Hrs. |
| 200 | 0 | 15 | SC[1] | SC | 19[2] |
| 200 | 2 | 15 | SC | SC/IC[3] | 4 |
| 200 | 5 | 15 | SC | SC | 5 |
| 200 | 5 | 0 | SC | SC | SC |
| 225 | 0 | 15 | SC | SC | 13 |
| 225 | 5 | 7.5 | SC | SC | IC |
| 225 | 5 | 15 | SC | SC | 4 |
| 225 | 5 | 0 | SC | SC | SC |
| 250 | 10 | 0 | SC | SC | SC |
| 250 | 10 | 5 | SC | SC | 5 |
| 250 | 10 | 7.5 | SC | IC | 3 |
| 250 | 10 | 15 | SC | 6 | 2 |

[1]SC indicates strong lipping crosslinked gel.
[2]Numbers are uncorrected viscometer readings.
[3]IC indicates intermediate lipping crosslinked gel.

From Table I it can be seen that the potassium bromate breaker functioned effectively to break the high viscosity fluid tested at temperatures in the range of from 200° to 250° F. in the presence of sodium thiosulfate gel breaker.

EXAMPLE 2

The test procedure set forth in Example 1 was repeated for a fluid having the composition set forth below.

| COMPONENT | AMOUNT |
|---|---|
| Guar gum | 40 pounds per 1000 gallons of water |
| Clay stabilizer concentrate | 2 gallons per 1000 gallons of water |
| Buffer | 0.1 gallon per 1000 gallons of water (pH adjusted to 6.0–6.1) |
| Zirconium crosslinker concentrate | 0.4 gallons per 1000 gallons of water |

The results of breaker tests conducted on the fluid are set forth in Table II.

TABLE II

Break Tests At Various Temperatures

| Temperature, °F. | Gel Stabilizer Concentration, Pounds Per 1000 Gallons Of Water | Gel Breaker Concentration, Pounds Per 1000 Gallons Of Water | Fann Viscometer Readings Or Extent Of Crosslinking | | |
|---|---|---|---|---|---|
| | | | 2 Hrs. | 6 Hrs. | 24 Hrs. |
| 200 | 0 | 15 | SC[1] | SC | 10[2] |
| 200 | 2 | 15 | SC | SC/IC[3] | 3 |
| 200 | 5 | 15 | SC | SC | 4 |
| 225 | 5 | 7.5 | SC | SC | 4 |
| 225 | 5 | 15 | SC | WC[4] | 3 |
| 225 | 5 | 30 | SC | 5 | 2 |
| 250 | 10 | 5 | SC | SC | 12 |
| 250 | 10 | 10 | SC | 12 | 3 |
| 250 | 10 | 15 | SC | 3 | 2 |

[1]SC indicates strong lipping crosslinked gel.
[2]Numbers are uncorrected viscometer readings.
[3]IC indicates intermediate lipping crosslinked gel.
[4]WC indicates weak crosslinked gel, not lipping.

EXAMPLE 3

The test procedure set forth in Example 1 was repeated using the fluid described in Example 2 having sodium thiosulfate gel stabilizer added thereto in the amount of 5 pounds per 1000 gallons of water. In addition to sodium bromate gel breaker, a copper II ion catalyst supplied by copper chloride was added to the test fluid in the amounts given in Table III below.

TABLE III

Break Tests at 225° F.

| Sodium Bromate Gel Breaker Concentration, Pounds Per 1000 Gallons Of Water | Copper Chloride (CuCl$_2$·2H$_2$O) Catalyst Concentration, Pounds Per 1000 Gallons Of Water | Fann Viscometer Reading Or Extent of Crosslinking | | |
|---|---|---|---|---|
| | | 2 Hrs. Crosslinking Extent | 6 Hrs. Crosslinking Extent | 16–24 Hrs. Crosslinking Extent |
| 15 | 0 | SC[1] | WC[2] | 3[3] |
| 2 | 0.45 | SC | WC | 4 |
| 2 | 0.9 | SC | WC | 3 |
| 0 | 1.8 | SC | SC | WC/IC |
| 2 | 1.8 | IC[4] | 5 | 3 |

[1]SC indicates strong lipping crosslinked gel.
[2]WC indicates weak crosslinked gel, not lipping.
[3]Numbers are uncorrected viscometer readings.
[4]IC indicates intermediate lipping crosslinked gel.

A comparison of Table III to Table II clearly shows that the presence of the copper catalyst allowed much lower concentrations of the sodium bromate gel breaker to be utilized.

EXAMPLE 4

Additional break tests were conducted using a fluid having the following composition.

| COMPONENT | AMOUNT |
| --- | --- |
| Carboxymethyl-hydroxypropyl guar | 40 pounds per 1000 gallons of water |
| Clay stabilizer concentrate | 2 gallons per 1000 gallons of water |
| Fumaric acid | 2.5 pounds per 1000 gallons of water |
| Sodium carbonate | 10 pounds per 1000 gallons of water |
| Sodium thiosulfate gel stabilizer | 20 pounds per 1000 gallons of water |
| Zirconium crosslinker concentrate | 0.4 gallons per 1000 gallons of water |

The test procedure described in the preceding examples was repeated utilizing the above fluid and a breaker additive of the present invention comprised of sodium bromate gel breaker and copper II ion catalyst. The results of these tests are given in Table IV below.

TABLE IV

Break Tests at 275° F.

| Sodium Bromate Gel Breaker Concentration, Pounds Per 1000 Gallons Of Water | Copper Chloride (CuCl$_2$.2H$_2$O) Catalyst Concentration, Pounds Per 1000 Gallons Of Water | Fann Viscometer Reading Or Extent of Crosslinking | | |
| --- | --- | --- | --- | --- |
| | | 2 Hrs. Crosslinking Extent | 6 Hrs. Crosslinking Extent | 16–24 Hrs. Crosslinking Extent |
| 7 | 2 | SC[1] | SC/IC[2] | 8[3] |
| 7 | 4 | SC | WC4 | 6 |
| 15 | 2 | SC | WC[4] | 4 |
| 15 | 4 | SC | 13 | 4 |
| 30 | 0 | SC | SC/IC | SC/IC |
| 30 | 2 | SC | 7 | 3 |
| 30 | 4 | WC+ | 2 | 2 |

[1]SC indicates strong lipping crosslinked gel.
[2]IC indicates intermediate lipping crosslinked gel.
[3]Numbers are uncorrected viscometer readings.
[4]WC indicates weak crosslinked gel, not lipping.

From Table IV it can be seen that the high viscosity treating fluids of the present invention achieve excellent breaks at temperatures as high as 275° F.

Thus, the present invention is well adapted to carry out the objects and attain the ends and advantages mentioned as well as those which are inherent therein. While numerous changes may be made by those skilled in the art, such changes are compassed within the spirit of this invention as defined by the appended claims.

What is claimed is:

1. A method of treating a subterranean formation or zone penetrated by a well bore and having a temperature above about 200° F. comprising:
    injecting a high viscosity gelled treating fluid which subsequently breaks into a low viscosity fluid into said formation or zone by way of said well bore, said gelled treating fluid being comprised of
        an aqueous liquid,
        a polysaccharide gelling agent present in an amount sufficient to increase the viscosity of said aqueous liquid selected from the group consisting of galactomannan gums, modified or derivative galactomannan gums and cellulose derivatives,
        a gel breaker to reduce the viscosity of said aqueous liquid after a desired period of time comprising an effective amount of a bromate ion releasing compound; and
    recovering said treating fluid from said formation or zone after it breaks into a low viscosity fluid.

2. The method of claim 1 wherein said bromate ion releasing compound is selected from the group consisting of alkali metal bromates.

3. The method of claim 11 which further comprises an effective amount of a catalyst for said gel breaker comprised of a transition metal ion releasing compound.

4. The method of claim 3 wherein said catalyst is selected from the group consisting of manganese ion releasing compounds and copper ion releasing compounds.

5. The method of claim 1 wherein said gelling agent is present in an amount in the range of from about 10 pounds to about 200 pounds per 1000 gallons of water in said treating fluid.

6. The method of claim 1 which further comprises a crosslinking agent for said gelling agent to further increase the viscosity of said aqueous liquid.

7. The method of claim 1 wherein said gel breaker is present in an amount in the range of from about 1 pound to about 30 pounds per 1000 gallons of water in said treating fluid.

8. The method of claim 3 wherein said catalyst for said gel breaker is present in an amount in the range of from about 0.05 pound to about 2 pounds per pound of gel breaker in the said treating fluid.

9. The method of claim 1 or 3 which further includes a thiosulfate gel stabilizer for stabilizing the viscosity of said aqueous liquid for a desired period of time and increasing the effectiveness of said gel breaker.

10. The method of claim 9 wherein said thiosulfate gel breaker is present in an amount in the range of from about 1 pound to about 30 pounds per 1000 gallons of water in said treating fluid.

11. A method of treating a subterranean formation penetrated by a wellbore wherein the temperature of a zone of the formation adjacent the wellbore is above about 200° F. comprising:
    injecting into the wellbore and into contact with said formation an aqueous fluid comprising (i) an aqueous liquid, (ii) a viscosity increasing amount of a polysaccharide gelling agent comprising at least one member selected from the group consisting of galactomannan gums, modified or derivatized galactomannans and cellulose derivatives, (iii) a crosslinker for said gelling agent, (iv) a gel stabilizing effective amount of a stabilizer comprising at least one member selected from the group of alkali metal thiosulfates and (v) a breaker comprising a bromate ion releasing compound present in an amount sufficient to effect controlled reduction in the viscosity of the aqueous fluid after a period of time within the zone of the formation.

12. The method of claim 11 wherein said bromate ion releasing compound is selected from the group consisting of alkali metal bromates.

13. The method of claim 11 wherein said aqueous fluid includes an effective amount of a catalyst for said breaker comprising a transition metal ion releasing compound.

14. The method of claim 13 wherein said catalyst is selected from the group consisting of manganese ion releasing compounds and copper ion releasing compounds.

15. The method of claim 11 wherein said crosslinker is selected from the group consisting of borate-releasing compounds, titanium IV ion releasing compounds, zirconium IV ion releasing compounds, chromium III ion releasing compounds, antimony III ion releasing compounds and aluminum III ion releasing compounds.

16. The method of claim 11 wherein said breaker is present in an amount of from about 1 to about 30 pounds per 1000 gallons of aqueous liquid.

17. The method of claim 11 wherein said gel stabilizer is present in an amount of from about 1 to about 30 pounds per 1000 gallons of aqueous liquid.

18. The method of claim 13 wherein said catalyst is present in an amount of from about 0.05 to about 2 pounds per pound of breaker in said aqueous fluid.

19. The method of claim 11 wherein said gelling agent is selected from the group consisting of guar-gum, hydroxypropyl guar, carboxymethylhydroxypropyl guar, carboxymethyl cellulose, carboxymethylhydroxyethyl cellulose, and hydroxyethyl cellulose grafted with vinyl phosphonic acid.

20. A method of fracturing a subterranean formation penetrated by a wellbore wherein the temperature of the formation adjacent the wellbore is above about 200° F., comprising injecting into the wellbore and into contact with the formation at a rate and pressure sufficient to fracture the formation, an aqueous fluid comprising:
 (a) an aqueous liquid;
 (b) a gelling agent comprising at least one member selected from the group consisting of galactomannans, modified or derivatized galactomannans, and cellulose derivatives present in an amount sufficient to increase the viscosity of said aqueous liquid;
 (c) a crosslinking agent for said gelling agent present in an amount sufficient to effect crosslinking of said gelling agent to further increase the viscosity of said aqueous liquid;
 (d) a gel stabilizer comprising at least one member selected from the group consisting of alkali metal thiosulfates present in an amount sufficient to stabilize the crosslinked gel viscosity for a desired period of time;
 (e) a breaker comprising a bromate ion releasing compound present in an amount sufficient to effect a controlled reduction in the viscosity of the crosslinked gelling agent of the aqueous liquid after a predetermined period of time; and
 (f) a catalyst for said breaker comprising a transition metal ion releasing compound present in an amount sufficient to activate the breaker to provide the controlled reduction in viscosity.

21. The method of claim 20 wherein said bromate ion releasing compound is selected from the group consisting of alkali metal bromates.

22. The method of claim 20 wherein said catalyst is selected from the group consisting of manganese ion releasing compounds and copper ion releasing compounds.

23. The method of claim 20 wherein said crosslinker is selected from the group consisting of borate-releasing compounds, titanium IV ion releasing compounds, zirconium IV ion releasing compounds, chromium III ion releasing compounds, antimony III ion releasing compounds and aluminum III ion releasing compounds.

24. The method of claim 20 wherein said breaker is present in an amount of from about 1 to about 30 pounds per 1000 gallons of aqueous liquid.

25. The method of claim 20 wherein said gel stabilizer is present in an amount of from about 1 to about 30 pounds per 1000 gallons of aqueous liquid.

26. The method of claim 20 wherein said catalyst is present in an amount of from about 0.05 to about 2 pounds per pound of breaker in said aqueous fluid.

27. The method of claim 20 wherein said subterranean formation has a temperature in the range of from above about 200° F. to about 300° F.

28. The method of claim 20 wherein said gelling agent is selected from the group consisting of guar gum, hydroxypropyl guar, carboxymethylhydroxypropyl guar, carboxymethyl cellulose, carboxymethylhydroxyethyl cellulose and hydroxyethyl cellulose grafted with vinyl phosphonic acid.

29. The method of claim 20 wherein said breaker is sodium bromate and said catalyst is copper chloride.

30. The method of claim 20 wherein said breaker is potassium bromate and said catalyst is copper chloride.

31. The method of claim 20 wherein said catalyst is copper sulfate.

* * * * *